May 16, 1967     F. G. LAMB ETAL     3,319,345
PERFORATED BED DRYER APPARATUS AND METHOD
Original Filed May 6, 1963
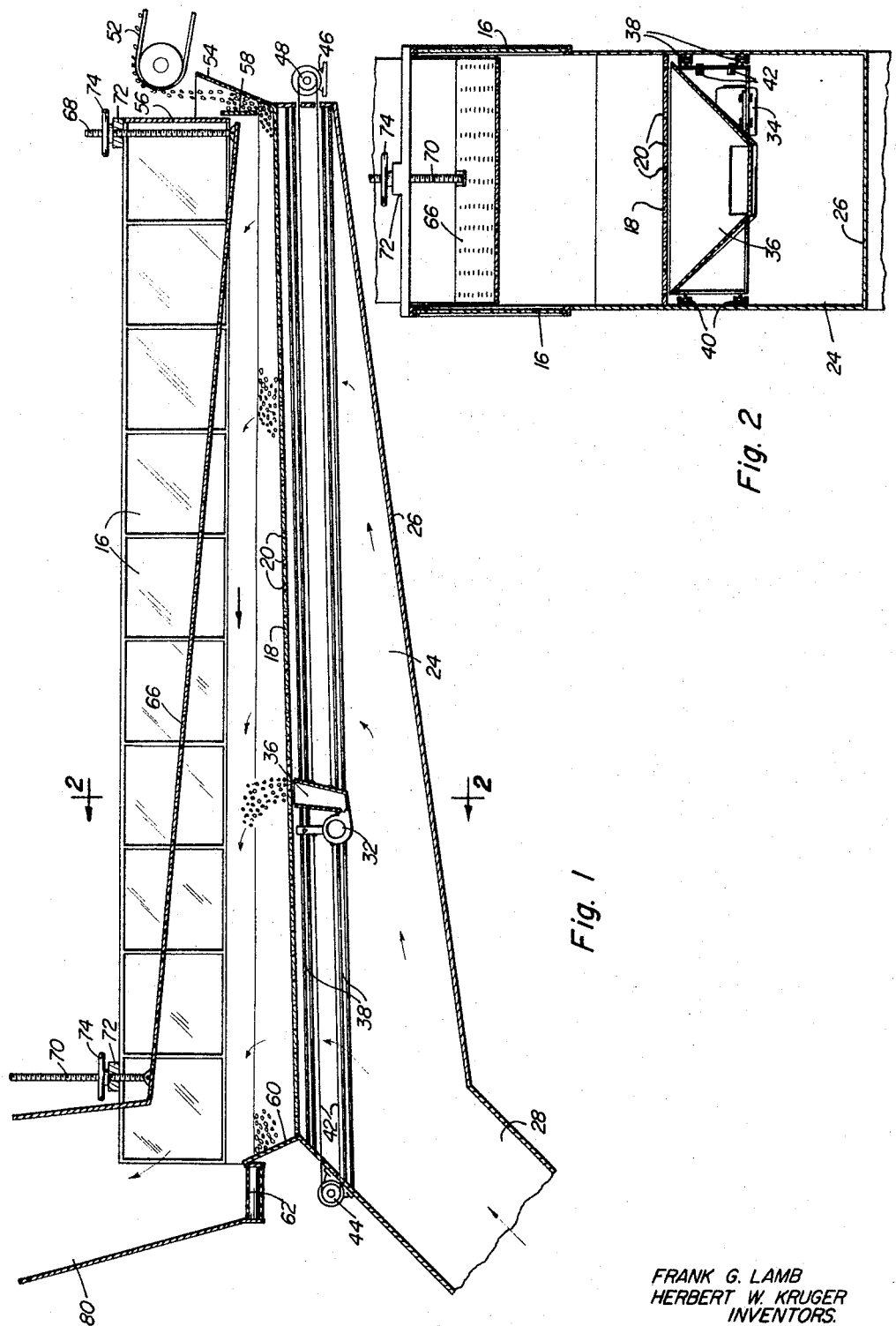
FRANK G. LAMB
HERBERT W. KRUGER
INVENTORS.
BY
BUCKHORN, BLORE, KLARQUIST & SPARKMAN
ATTORNEYS

United States Patent Office 3,319,345
Patented May 16, 1967

3,319,345
PERFORATED BED DRYER APPARATUS
AND METHOD
Frank G. Lamb and Herbert W. Kruger, both of Portland, Oreg., assignors to Lamb Weston, Inc., Portland, Oreg., a corporation of Oregon
Continuation of application Ser. No. 278,037, May 6, 1963. This application Apr. 26, 1966, Ser. No. 545,508
5 Claims. (Cl. 34—10)

This application is a continuation of application Ser. No. 278,037, filed May 6, 1963, now abandoned.

The present invention relates to dehydrating apparatus and methods and more particularly to apparatus and methods for drying particulate food products such as fresh peas, diced potatoes and the like.

A very basic type of dryer utilized heretofore comprises perforated trays in which a layer of the product to be dried is positioned and upwardly through which heated air or other drying medium is passed. Air passing upwardly through such a layer causes the bottom most product to dry much more rapidly than the product in the upper part of the layer. Continued exposure of the lowermost product to the heated air frequently causes a case hardening effect on the product increasing the difficulty of extracting moisture therefrom. With such a dryer it is virtually impossible to secure a uniform moisture content in the product short of bone dryness and the case hardening effect frequently makes even complete drying difficult. To overcome this problem, various drying apparatuses have been devised in which the product is subjected to agitation. For example, fluidized bed type dryers are in use wherein air is passed upwardly through the product being dried at such a velocity as to suspend or fluidize the product particles. In such an instance the product particles are continually abrading one another and for many products this is undesirable because of the resulting injury. Also, in such dryers the product is supported on a perforated plate which has a relatively large resistance to air flow whereby considerable power is required to force air through the dryer.

Rotating drum type dryers having coaxial perforated drums have also been devised to effect periodic agitation of a product being dried. Such dryers are initially expensive and also expensive to maintain and difficult to clean. Furthermore, with such dryers it is not possible to attain a uniform, intermediate moisture content in the product particles.

A principal object of the present invention is to provide a simple, economical, dehydrating apparatus which may be utilized to partially dehydrate particulate food products to a substantially uniform moisture content. Such processes are desired in connection with the handling of many products such as, for example, fresh green peas. It has been found that fresh green peas which have a normal moisture content of about 75% or more by weight can be successfully frozen and re-constituted to natural appearance and flavor if the moisture content in the pea is reduced to between about 35% and 50% before freezing. The partially dehydrated frozen product can, of course, be shipped more cheaply than the natural frozen pea because of its lesser weight.

Partial dehydrating of fresh green peas is also desired in another process wherein the peas are eventually reduced to a moisture content of about 5% to 7%. In the latter process, the peas are shelled, size graded, and pricked through their skin so as to facilitate the escape of moisture. The peas are then blanched in a solution containing sodium carbonate and sodium sulphite, the former of which acts as a tenderizer and the latter as a preservative. Difficulty has been encountered in handling the peas from this point in that the peas become somewhat sticky in the blanching operation and tend to adhere to one another until their moisture content is reduced to about 60%.

Accordingly, it is a further object of the invention to provide a dehydrating apparatus that may successfully reduce the moisture content of wet sticky products.

A further object is to provide apparatus capable of dehydrating food products to a controlled, uniform moisture content without injury to the product.

Another object of the invention is to provide a dehydrating apparatus that is simple in construction, has few mechanically moving parts and which may be inexpensively constructed.

Still another object of the invention is to provide a drying apparatus in which product may be continuously processed and which will effect substantially uniform drying of the product.

A further object is to provide a dryer having a minimum head loss whereby it may be operated economically.

Still other objects and advantages of the invention will become more apparent hereinafter.

In accordance with the illustrated embodiment, the present invention comprises a drying apparatus including an elongate housing through which extends a perforated product supporting plate onto one end of which wet product is fed and off of the other end of which the dehydrated or partially dehydrated product is withdrawn. The housing defines a plenum beneath the plate arranged to distribute drying air substantially evenly over the entire plate surface. The housing also defines a plenum or chamber above the plate having an exit port for the air so arranged that movement of the air above the plate is in the direction toward the product discharge end thereof. Positioned in the plenum beneath the product supporting plate is a reciprocating blower adapted to blow a band of air upwardly through the plate so as to elevate or lift from the plate any product disposed thereon, the normal velocity of the drying air passing upwardly through the plate being such that the product may remain substantially at rest thereon. Means are provided to reciprocate the blower longitudinally at period intervals whereby the product is agitated and redistributed by the band of lifting air from the blower. In the redistribution a desirable vertical classification of the product occurs as will be described more fully hereinafter. The chamber above the plate has a cross-section such that the air velocity in the direction toward the exit is sufficient to effect movement of the product, as it is blown upwardly by such band of lifting air, toward the discharge end of the plate thus effecting longitudinal movement and further classification of the product on the plate.

For a more detailed description of the invention reference is made to the appended drawings wherein FIG. 1 is a longitudinal cross-sectional view of an apparatus made in accordance with the invention and FIG. 2 is a sectional view taken substantially along the line 2—2 of FIG. 1.

Referring now to the drawings, the illustrated embodiment of the invention comprises an elongate housing 10 defined by parallel side walls 12, 14, the upper portions of which may be formed of glass as indicated at 16 to permit observation of the product being dehydrated. Extending longitudinally of the housing between the plates 12, 14 is a perforated product supporting member or plate 18 which preferably has the maximum permissible amount of open space consistent with supporting the product to be dried so that the plate has a minimum resistance to air flow therethrough. Openings 20 are indicated in the plate as relatively widely spaced apart but this is only for the purpose of ease of illustration and it is to be understood that the openings preferably are closely adjacent to one another so as to provide maximum open area possible for the product being treated. An open area of from 40 to 90 percent may be utilized. Positioned below the bottom plate and extending the length thereof is plenum 24 defined by the side walls 12, 14 and a bottom plate 26. Drying air may be introduced in any suitable manner to the plenum. In the illustrated embodiment the plenum 24 is connected at one end by a suitable duct 28 to any suitable source of heated drying air (not shown). The bottom plate 26 preferably slopes upwardly from the entrance of the drying air so that the cross-sectional area of the plenum continually decreases to effect substantially uniform velocity of air throughout the plenum.

In operation of the dryer, air is introduced through the duct 28 at a rate such that the product disposed upon the plate remains substantially at rest. That is, the normal air flow passing upwardly through the plate 18 is maintained below the velocity at which the product thereon is "fluidized," that is, assumes the characteristics of a fluid mass and wherein the product particles are in continual motion and capable of flowing in the manner of a liquid. Instead, in accordance with the invention the flow rate of air through the duct 28 is maintained so that the particles of product being dried remain substantially at rest so that they do not abrade one another. In some instances, commencement of blowing of air through a layer of product on the bed will be accompanied by an observable rise in the elevation of the top level of the product. This apparently is caused by a realignment of the particles in the bed to positions of minimum contact so as to provide a maximum cross-sectional area between the particles for passage of air upwardly between the particles. Also under maximum flow rates of drying air in accordance with the invention occasional "boils" or upwelling may occur in the bed but the majority of the product particles remain motionless with respect to each other.

Means are provided periodically to force a jet of air upwardly through the plate 18 substantially to elevate the product from the plate and effect a mixing and agitation of the product. This may be done by effecting an increase in the amount of air introduced into the plenum 24. An increase of sufficient amount will cause a breakthrough and lifting and fluidization at the place of least resistance in the bed which is generally at the end of product outfeed. Once a breakthrough occurs it moves progressively along the plate to the opposite end thereof effecting lifting and agitation of the product. If the air velocity is then reduced to the normal drying rate the bed will remain quiescent. However, means preferably are provided positively to create and direct a band of air upwardly through the plate. Referring again to the drawing, in the illustrated apparatus there is mounted within the plenum 24 a blower or agitating means comprising a centrifugal fan 32 driven by a motor 34 and adapted to withdraw air from the plenum and discharge it into a nozzle or distributing duct 36, the discharge end of which defines an elongate opening extending the width of the plate 18 and immediately therebelow whereby the fan 32 is adapted to blow a narrow, transverse band of air at high velocity upwardly through the plate 18 so that the product is lifted substantially, above the normal level of the product layer. In processing peas, for example, it is desirable that the peas be lifted several inches above the product layer surface. While the term "fluidization" is used hereinafter to describe this action, it is to be understood that the product entrained in the central portion of the band undergoes a greater amount of lifting and agitation than is generally associated with fluidization. The product entrained in the lower velocity portions of the air band are more truly fluidized as the term is normally used.

Means are provided for reciprocating the blower longitudinally of the plenum. As best seen in FIG. 2, the blower is supported by means of rollers 38 in tracks 40 secured to the walls 12, 14 and extending longitudinally of the chamber. Fixed to the blower are the opposite ends of a cable 42 which extends over an idling pulley 44 at one end of the plenum and is reeved over a pulley 46 driven by a reversible motor 48 positioned at the opposite end of the plenum. By suitable operation of the motor 48 the blower may be caused to traverse the length of the plate 18 and then to reverse its movement. The fan 32 in some instances may be operated during movement in both directions and in other instances it may be desired to operate it only in one direction. Furthermore, the period of reciprocation will depend upon the product being dried and the characteristics desired. It will be apparent that in the case of very wide dryers two or more blowers side-by-side may be desirable, or in the case of exceptionally long dryers two or more longitudinally spaced blowers may be utilized.

Means are provided for feeding the wet product to the entrance end of the plate, the illustrated means comprising a conveyor 52 driven to discharge product into a hopper 54. The hopper 54 is defined in part by an end wall 56 of the dryer on which may be suitably mounted a vertically adjustable weir 58 which can be raised or lowered to regulate the depth of the product fed from the hopper 54 onto the plate 18. At the discharge end of the dryer there is positioned a plate 60 which acts more or less as a dam and over which the product may spill onto a conveyor 62 which bears the dehydrated product off to one side of the dryer apparatus for further treatment as desired. Preferably the plate 18 slopes downwardly from the entrance end to the discharge end thereof.

Preferably the top wall of the chamber over the plate 18 is vertically adjustable in height so that the cross-sectional area of the chamber may be varied. In the illustrated embodiment the top of the chamber is defined by a perforated plate 66 supported in vertically adjustable relation by screw jacks 68 and 70 which are hingedly connected to the opposite ends of the plate 66 and extend upwardly through transverse support members 72. The screws 68, 70 extend through hand wheels 74 cooperatively threaded to receive the screws 68, 70, the hand wheels being supported by the cross member 72 whereby the plate 66 is suspended therefrom. The chamber over the plate 18 is open to a duct 80 at the discharge end of the plate 60 and through which the drying air may be released from the apparatus. As will be apparent, by adjustment of the height of the plate 66 the horizontal velocity of the air over the plate 18 may be controlled. In some instances excessive head room might be required if the top 66 were a solid member and it was desired to secure a minimum velocity of air flow toward the discharge end. Accordingly, the top wall 66 preferably is perforated so that some of the air may bleed off through such perforations and which will lessen the over-all amount and velocity of the passing air over the bed toward the discharge duct 80.

*Operation*

In operating the device of the apparatus the product is fed into the apparatus through the hopper 54 and drying air introduced through the duct 28 into the plenum 24. The blower 32 is placed in operation and its reciprocation of the plenum commenced. The maximum rate at which air is introduced through the duct 28 and the plenum 24 will be such that the layer of product on the plate 18 will, as described previously, remain substantially undisturbed by reason of the normal flow rate of air upwardly through the plate 18. The drying characteristics of the product being dried, the degree of final dryness of the product and the desired drying rate will also enter into the setting of the flow rate and temperature of the drying air. It should be noted that at the desired normal flow rate the drying air itself has a leveling effect upon the product as feeding thereof into the dryer commences. Since the initial product particles are not weighted down by the overlying particles of a normal bed they are more or less fluidized and tend to spread out over the plate 18 first approximately one layer deep, then two layers, and progressively into a bed of increasing but substantially uniform thickness until finally the weight of the product overcomes the lifting force of the drying air and the bed becomes substantially quiescent.

The blower 32 is operated at such a rate that the product supported on the bed is elevated and agitated, that is, fluidized, by the air emerging from the nozzle 36 in passing upwardly through the plate 18. In the event of processing wet peas, for example, the normal flow rate of the drying air passing up through the plate 18 should be at a lineal velocity of about 400 feet per minute. The blower 32, on the other hand, should be capable of developing a draft of air which will blow upwardly through the plate at about 3,000 feet per minute or greater.

The period of reciprocation of the blower 32 will depend upon the product being dried, the rate of feed-through desired, desired final moisture content and similar factors. Some products are characterized by slow migration of moisture from the interior to the outer layers and others by a tendency to case harden when exposed to heat for too long a period. In such instances relatively frequent reciprocation is desired so that the lower layers of such products may be moved to a higher position in the bed where the contacting air will be cooler and have a higher relative humidity so as to permit time for the interior moisture in such particles to migrate to the surface.

Other products may require relatively longer exposure to air of high temperature and relative dryness and in such instances less frequent reciprocation of the blower would be made.

The lifting band of air also effects a leveling of the product bed. If, for example, product is added to increase the product depth at any point, as the blower 32 passes beneath such point the elevated product flows almost like a liquid and the bed levels out.

The top wall 66 of the apparatus is adjusted in elevation so that the cross-sectional area of the chamber defined above the plate 18 will be such as to cause the air to have a horizontal velocity toward the discharge end of the dryer such that the particles lifted or fluidized by the reciprocating blower 32 are moved a desired amount in the direction toward the discharge end of the dryer by the horizontally moving air stream. The slope on the plate 18 toward the discharge end will also cause "flow" or movement of the fluidized product particles toward the discharge end of the dryer apparatus.

In addition to loosening the product upon the plate 18 and redistributing the same and effecting movement toward the discharge end, the lifting of the product with the blast from the blower 32 results in a classification of the product, the classification occurring vertically and horizontally. It is apparent that as a product particle loses moisture it also loses weight. Thus a dryer particle will tend to be sustained by the air stream from the blower 32 for a longer period of time than a particle having a higher moisture content, hence, heavier. Moreover, most particles as they lose moisture tend to shrink in size and wrinkle and have a relatively greater surface area per unit mass than do the wetter product particles whereby their tendency to be entrained in the air streams for a longer period is enhanced. Consequently the dryer particles tend to be moved further by the air streams, vertically by the lifting air and horizontally by the discharge air. In other words, the heavier, wetter product particles will tend to drop back to the product plate at a faster rate than will the drier particles, so that the latter not only fall toward the top layer of the product layer on the plate 18 but will also tend to move at a faster rate toward the discharge end of the dryer. It is, of course, desirable that the wetter product be at the bottom of the layer and adjacent the plate 18 for the air moving upwardly through the plate will at that point be at its driest and at its highest temperature so that faster evaporation may be induced from the lowermost product.

Certain products display varying drying characteristics as moisture is removed therefrom and to most efficiently dry such products it may be desirable to increase or slow down the horizontal movement and classification of the product particles at certain stages of dryness. For this purpose the upper wall 66 of the upper chamber may be constructed as a flexible or multisection member so that the cross section of the chamber above the plate 18 may be raised or lowered at different points along the length of the plate to vary the velocity of the air over the bed at such points.

The net result of the vertical and horizontal classification that occurs is that the product particles discharged from the end of the dryer will have a substantially uniform moisture content and by regulating the depth of product maintained upon the plate 18 and the rate at which the product moves through the chamber as well as the temperature and air velocity, the moisture content of the product particles as they are discharged may be controlled within narrow limits. This is a feature of the device of the invention that has not heretofore been attainable, that is, accurate moisture control of the product at some predetermined level. It has been possible heretofore to dry products substantially uniformly to complete, or almost complete, dryness but equipment as provided heretofore has not been successful in partially drying or dehydrating the product to some intermediate level of dryness.

It will be observed that with certain products and by adequate control of the horizontal velocity of movement of air through the drying chamber it may be possible to secure satisfactory horizontal movement of the product on a perfectly level product supporting plate. It will be further observed that the apparatus is simple in construction and operation and may be easily serviced and maintained and kept in clean condition.

Having illustrated and described a preferred embodiment of the invention, it should be apparent to those skilled in the art that it permits of modification arrangement and detail. We claim all such modifications as come within the scope of the appended claims.

We claim:

1. The method of drying a particulate product comprising continuously feeding a wet particulate product onto one end of a perforated support, forcing a drying gas upwardly through said support and the product thereon, at a predetermined velocity less than that which will fluidize said product from said support, periodically forcing agitating gas through the product at a velocity substantially higher than said predetermined velocity and sufficiently high to elevate said product from said support and fluidize said product to separate and mix the particles of the product, and guiding said gases as they emerge from said support toward the opposite end of said support at a velocity sufficient to impart movement of said elevated particles toward said opposite end whereby said fluidized product will be carried by said gases toward said opposite end and simultaneously will undergo classification so that the product discharged from said opposite end of said support will be of substantially uniform moisture content.

2. The method of drying a particulate product comprising:

continuously supplying the particulate product to one end of an elongated, stationary, perforated support, continuously blowing hot air upwardly through said support and product at a velocity below that sufficient to substantially raise the product from the support, periodically blowing a jet of air upwardly through said support at a velocity sufficient to elevate and agitate said product and moving said jet from one end of said support to the other, and causing the air emerging from said support to move in the direction from the end on which the product is fed toward the opposite end thereof at a velocity sufficient to impart movement of said elevated product toward said opposite support end whereby product will be moved toward said opposite end by said emerging air.

3. The method of drying a particulate food product comprising:

continuously feeding a wet particulate food product onto the upper end of a substantially uniformly perforated, inclined support, forcing drying air upwardly through said support and through the product on the support with velocities varying periodically between a first velocity sufficiently high to agitate the product and break apart product stuck together and a second, substantially lower drying velocity below that at which said product will be lifted from the support, and continuously removing dried product from the lower end of said support.

4. In apparatus for drying a divided product, an inclined perforated support having a receiving end and a discharge end, said receiving end being at an elevation above that of said discharge end, means for continuously supplying product to be dried to the receiving end of the support to form at said receiving end a layer of product of predetermined depth, means for forcing hot air upwardly through said support at a first velocity below that sufficient to elevate said product layer from said support, means to provide a band of air extending the width of said support and blowing upwardly through said support at a velocity sufficiently high to elevate said product from said support and fluidize the product entrained in said band, and means periodically to cause said band of air to move longitudinally of said support.

5. In apparatus as set forth in claim 4, wherein said means periodically to cause said band of air to move longitudinally of said support comprises a blower mounted beneath said support for reciprocation longitudinally thereof.

References Cited by the Examiner

UNITED STATES PATENTS 3,012,331  12/1961  Oholm et al. _____ 34—10
3,060,589  10/1962  Wallin _____ 34—13

FOREIGN PATENTS 305,283  2/1933  Italy.

FREDERICK L. MATTESON, JR., Primary Examiner.

JOHN J. CAMBY, Examiner.